3,773,729
BLOCKED POLYURETHANES CONTAINING QUATERNARY AMMONIUM OR ALKALI METAL SALT GROUPS

Saburo Wakimoto, Hyogo, Hideyoshi Tugukuni, Osaka, Masafumi Kano, Kyoto, Yutaka Matsui, Hyogo, and Seiju Kazama and Jugo Goto, Osaka, Japan; said Wakimoto, Tugukuni, and said Kano assignors to Dai Nippon Toryo Co., Ltd., said Matsui, Kazama and said Goto assignors to Takeda Chemical Industries, Ltd., both of Osaka, Japan
No Drawing. Filed Apr. 15, 1971, Ser. No. 134,487
Claims priority, application Japan, Apr. 21, 1970, 45/34,114
Int. Cl. C08g 22/32, 22/12
U.S. Cl. 260—77.5 TB  2 Claims

ABSTRACT OF THE DISCLOSURE

The present invention is directed to a blocked isocyanate polymer of the general formula:

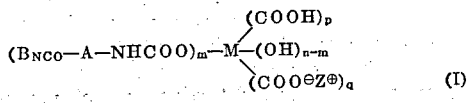

or

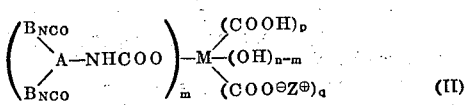

wherein $B_{NCO}$ is a blocked NCO group, A is a radical derived by removing all NCO groups from an organic diisocyanate in compound I or an organic triisocyanate in compound II, M is a radical derived by reducing all OH groups and carboxyl and its salt groups from a high molecular compound having a molecular weight of about 350 to about 30,000 and an acid value of about 30 to about 350 and containing $n$ OH groups per molecule and carboxyl groups, about 40 to 100 mole percent of which are in the form of a quaternary ammonium salt or alkali metal salt, $n$ and $m$ are positive numbers of not less than 1, wherein $(2+n)$ in Formula I and $(3+n)$ in Formula II are both at least 5, whereas $n/2m$ in Formula I and $n/3m$ in Formula II are more than about 0.5, but less than about 4.0, Z is a quaternary ammonium cation or alkali metal cation, $(p+q)$ is such a number that a compound of $(HO)_n$—M—$(COOH)_{p+q}$ has an acid value of about 40 to about 150, and $q/(p+q) \times 100$ is 100 to about 40. The present invention, similarly, relates to a method of producing the aforementioned blocked isocyanate polymer type compounds. These compounds are useful as coating agents, adhesive agents and the like.

---

The present invention is concerned with a method for the production of a water-miscible blocked polyurethane useful as coating agents, adhesive agents and the like.

Heretofore, there have been known two kinds of coating agents, one being water-miscible coating agents which are soluble or dispersible in water, and the other being so-called solvent-type coating agents which are soluble in organic solvents.

For the application of solvent-type coating agents, a large amount of various organic solvents is necessary, and this results in high cost of the products, injurious effects to human beings, corrosive or destructive effects to instruments or apparatus, and particularly, environmental pollution. Moreover, solvent-type coating agents are very inflammable. In fact, some countries have established various regulations concerning the kind of organic solvents to be used industrially and the treatment of the solvents on a commercial scale for the purpose of removing and preventing "public nuisance." Therefore, when solvent-type coating agents are used industrially, the greatest possible care should be paid in order to minimize the above mentioned dangers.

In contrast, for the application of water-miscible coating agents, no organic solvent is necessary, i.e. use of water is sufficient. Thus, they have none of the defects as mentioned above in regard to the solvent-type coating agents.

From an industrial point of view, therefore, the water-miscible coating agents are much more advantageous than the solvent-type ones. However, the hitherto known water-miscible coating agents have a further defect, i.e. the coating film prepared from the known water-miscible coating agents is inferior to that prepared from the solvent-type ones in its physical and mechanical properties, particularly in its resistance to water or humidity, resistance to chemicals and abrasion resistance.

It has, thus, long been desired to provide water-miscible coating agents capable of producing a coating film of physical and mechanical properties as good as those of a coating film prepared from solvent-type coating agents.

The present inventors have sought to achieve this objective. On the other hand, certain members of the present inventors have previously discovered a method for producing a novel and particular blocked polyurethanes which are useful as coating agents, etc. These novel polyurethanes have been disclosed in copending application Ser. No. 33,081, filed Apr. 29, 1970.

Our studies have led us to a finding that this objective can be fulfilled by modifying the above novel blocked polyurethane in a specified manner.

The present invention has been accomplished on the basis of this finding.

Thus, the principal object of the present invention is to provide a water-miscible blocked polyurethane compound which can be used as coating agents, etc. and can produce a coating film having excellent physical and mechanical properties, particularly high water or humidity resistance, high resistance to chemicals and high abrasion resistance.

Another object of the present invention is to provide a method for the production of the above polyurethane compound.

In the method of the present invention, a partially blocked polyisocyanate having at least one free NCO group and at least one blocked NCO group per molecule is allowed to react with a high molecular compound containing OH groups and carboxylic groups, or its quaternary ammonium or alkali salt groups, wherein the total number of free NCO and blocked NCO groups per molecule of the partially blocked polyisocyanate to be used and OH groups per molecule of the high molecular compound to be reacted with the polyisocyanate is at least 5, at such a ratio that (OH group)/(free NCO groups) is at least 1 and (OH groups)/(free NCO groups+blocked NCO groups) is about 0.5 to about 4.0, whereby there is produced a high molecular compound containing at least one urethane linkage and having blocked NCO groups, OH groups and carboxylic groups in its molecule or the quaternary ammonium or alkali salt thereof, the total number of blocked NCO groups and OH groups being at least 3 per molecule, but having substantially no free NCO group, and then, when the resultant product contains in its molecule no carboxylic quaternary ammonium or alkali salt group, all or part of the free carboxylic groups are converted into their quaternary ammonium or alkali salt groups.

The object compound of the present invention can easily be led to a cross-linked polymeric substance by heating without using other active hydrogen-containing polymers.

The object compound of the present invention is soluble or dispersible in water, and a cured substance prepared therefrom shows excellent physical and mechanical properties, particularly high water or humidity resistance, high resistance to chemicals and high abrasion resistance. Thus the object compound of the present invention can be used quite advantageously as a water-miscible coating agent, and, further, as adhesive agents and finishing agents for fibers or fibrous materials, etc. Additionally, because of its high miscibility with water, an aqueous solution or dispersion of the present compound can advantageously be applied on a substrate by an electro-deposition coating technique.

A detailed description of the method of the present invention is given below.

The one starting material of the present method is a partially blocked polyisocyanate having at least one free NCO group and at least one blocked NCO group per molecule, more particularly, with the proviso that the total amount of the free NCO groups and the blocked NCO groups per molecule is up to 3. Use is thus made of a partially blocked di- or triisocyanate having 1 to 2 free NCO groups and 1 to 2 blocked NCO groups per molecule, which includes a diisocyanate having one free NCO group and one blocked NCO group per molecule, a triisocyanate having one free NCO group and two blocked NCO groups per molecule and a triisocyanate having two free NCO groups and one blocked NCO group per molecule. These partially blocked polyisocyanates are prepared by allowing a di- or triisocyanate to react with a blocking agent in an amount of about 0.04 to about 0.7 mole per NCO group in a conventional manner, for example, by heating at about 50 to about 160° C. in the presence or absence of an inert solvent and a catalyst. Examples of the inert solvent used are: esters (e.g., ethyl acetate, butyl acetate, etc.), ketones (e.g. methylethyl ketone, methylisobutyl ketone, etc.), ethers (e.g. diethyl ether, ethoxyethyl acetate, etc.) and aromatic hydrocarbons (e.g. benzene, toluene, etc.). The catalyst is selected from tertiary amines (e.g. triethylamine, triethylene diamine, N-methyl morpholine, etc.) and organic tin compounds (e.g. stannous octoate, dibutyltin dilaurate, tetraalkyl distannoxanes, etc.). The reaction mixture may contain unreacted di- or triisocyanate or completely blocked di- or triisocyanate. In the present method, the reaction mixture as such may be used without purification, but, preferably the unreacted di- or triisocyanate and completely blocked isocyanate are removed from the reaction mixture by a suitable manner such as extraction, distillation, adsorption, thin film evaporation, filtration, recrystallization, etc. The removal of these by-products is particularly desirable in the case of allowing the product to react with an acrylic acid type polyol mentioned hereinafter. The amount of the blocking agent is, as mentioned above, about 0.04 to about 0.8 mole per NCO group, and, more preferably, about 0.1 to about 0.3 mole per NCO group when the reaction product is used in the subsequent step after removing the above mentioned by-products, and about 0.4 to about 0.6 mole per NCO group when the reaction product as such is used in the subsequent step without removing the by-products.

The di- or triisocyanate employed for the reaction with a blocking agent may be any of the hitherto known ones including aromatic ones, aliphatic ones and other type di- or triisocyanates. Typical examples of the polyisocyanates are ethylene diisocyanate, propylene diisocyanate, tetramethylene diisocyanate, hexamethylene diisocyanate, $\omega,\omega'$-diisocyanate-1,3-dimethyl benzene, $\omega,\omega'$-diisocyanate-1,4-dimethyl benzene, $\omega,\omega'$-diisocyanate-1,3-dimethyl cyclohexane, $\omega,\omega'$-diisocyanate, 1,4-dimethyl cyclohexane, 1-methyl-2,4-diisocyanate cyclohexane, $\omega,\omega'$ - diisocyanate diethyl benzene, $\omega,\omega'$-diisocyanate dimethyl toluene, $\omega,\omega'$-diisocyanate diethyl toluene, $\omega,\omega'$-diisocyanate dimethyl xylene, $\omega,\omega'$-diisocyanate diethyl xylene, 4,4'-methylene-bis(cyclohexyl isocyanate), 4,4'-ethylene-bis(cyclohexyl isocyanate), phenyl diisocyanate, 2,4-tolylene diisocyanate, 2,6-tolylene diisocyanate, naphthylene diisocyanate, 4,4'-methylene-bis(phenyl isocyanate), isophorone diamine diisocyanate, lysine diisocyanate, triphenylmethane triisocyanate, triphenylsulfone triisocyanate, trimethylbenzene-2,4,6-triisocyanate, 1 - methylbenzene-2,4,6-triisocyanate, diphenyl-2,4,4'-triisocyanate, etc., di- or triisocyanates prepared by reacting an excess amount of the above mentioned isocyanate with a low molecular diol or triol (e.g. ethylene glycol, propylene glycol, 1,3-butylene glycol, neopentyl glycol, 2,2,4-trimethyl-1,3-pentandiol, hexamethylene glycol, cyclohexane dimethanol, trimethylol propane, hexane triol, glycerine, etc.), trimers of diisocyanates (e.g. TDI trimer, XDI trimer, etc.), and other various di- or triisocyanates containing biuret linkages and/or allophanate linkages.

As the blocking agent, any of the hitherto known ones may be used in this method. Typical examples of them are phenol types (e.g. phenol, cresol, xylenol, nitrophenol, chlorophenol, ethyl phenol, t-butylphenol, hydroxy benzoic acid, hydroxy benzoic acid esters, 2,5-di-t-butyl-4-hydroxy toluene, etc.), lactam types (e.g. $\epsilon$-caprolactam, $\delta$-valerolactam, $\gamma$-butyrolactam, $\beta$-propiolactam, etc.), active methylene types (e.g. diethyl malonate, dimethyl malonate, ethyl acetoacetate, methyl acetoacetate, acetyl acetone, etc.), alcohol types (e.g. methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxyethanol, glycolic acid, glycolic acid esters, lactic acid, lactic acid ester, methylol urea, methylol melamine, diacetone alcohol, ethylene chlorohydrine, ethylene bromhydrine, 1,3-dichloro-2-propanol, $\omega$-hydroperfluoro alcohol, acetocyanhydrine, etc.), mercaptan types (e.g. butyl mercaptan, hexyl mercaptan, t-butyl mercaptan, t-dodecyl mercaptan, 2-mercapto-benzothiazole, thiophenol, methyl thiophenol, ethyl thiophenol, etc.), acid amide types (e.g. acetoanilide, acetoanisidine amide, acrylamide, methacrylamide, acetic amide, stearic amide, benzamide, etc.), imide types (e.g. succinimide, phthalimide, maleimide, etc.), amine types (e.g. diphenylamine, phenylnaphthylamine, xylidine, N-phenyl xylidine, carbazole, aniline, naphthylamine, butylamine, dibutylamine, butyl phenylamine, etc.), imidazole types (e.g. imidazole, 2-ethylimidazole, etc.), urea types (e.g. urea, thiourea, ethylene urea, ethylene thiourea, 1,3-diphenyl urea, etc.), carbamate types (e.g. N-phenyl carbamic acid phenyl ester, 2-oxazolidone, etc.), imine types (e.g. ethylene imine, etc.), oxime types (e.g. formaldoxime, acetaldoxime, acetoxime, methylethyl ketoxime, diacetylmonoxime, benzophenonoxime, cyclohexanonoxime, etc.) and sulfurous acid salt types (e.g. sodium bisulfite, potassium bisulfite, etc.). Among these examples, use is preferably made of the phenol types, lactam types, active methylene types and oxime types.

The other starting material of this method includes a high molecular compound containing OH groups and carboxylic groups in its molecule. The molecular weight of this compound is about 350 to about 30,000, more desirably about 1000 to about 10,000. This high molecular compound is one having an acid value of about 30 to 350, and more preferably about 40 to about 150. The number of OH groups per molecule of this compound is not less than 2, more particularly 2 to 20, and preferably 3 to 12. The number of carboxylic groups per molecule is that corresponding to the above specified acid value. As the starting material, use can also be made of the compound which is obtainable by converting all of or a part of the carboxylic groups of the above defined high molecular compound into the quaternary ammonium salt or alkali metal salt. The amount of the carboxylic groups to be converted into the salt is about 40 to 100 mole percent, more desirably about 60 to about 90 mole percent, relative to the total carboxylic groups.

Typical examples of the high molecular compound wherein all the carboxylic groups are free form are as follows:

(a) Copolymers of (1) a polymerizable unsaturated carboxylic acid, (2) an alkyleneglycol monoester of a polymerizable unsaturated carboxylic acid, and if desired (3) other polymerizable monomer. The polymerizable unsaturated carboxylic acid includes acrylic acid, methacrylic acid, maleic acid, fumaric acid, etc. The second component includes alkyleneglycol monoesters, of the above exemplified carboxylic acids, which are illustrated by the following general formulae;

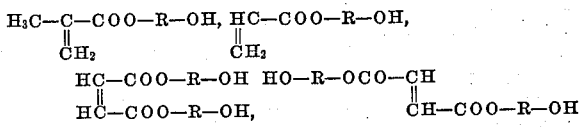

(wherein R is a lower alkylene having 1 to 6 carbon atoms, such as methylene, ethylene, propylene, methyl methylene, isopropylene, butylene, isobutylene, etc.). The second component can be prepared by allowing the corresponding alkylene oxide to react with the polymerizable unsaturated carboxylic acid in a conventional manner such as described in Japanese patent publications Nos. 8,486/1969 and 2,726/1970, etc.

The third component is exemplified by acrylic acid esters, methacrylic acid esters, acrylonitrile, styrene, butadiene, vinyl acetate, vinyl chloride, vinyl alcohol, vinylidene chloride, ethylene, propylene, isoprene, etc. The ratio of the respective components to each other is optional so long as the above defined ranges concerning the number of OH groups, the acid value, and the molecular weight are fulfilled. The copolymerization of the components can be conducted after a conventional manner, for example, that described in U.S. Pat. 3,028,367, Japanese patent publication No. 9,240/1968, etc.

(b) Polyesters prepared by reacting a low molecular polyol such as glycerin, pentaerythritol, trimethylolpropane, hexanetriol, sorbitol, sucrose, etc. with a polycarboxylic acid such as maleic acid, phthalic acid, fumaric acid, trimellitic acid, pyromellitic acid, adipic acid, itaconic acid, succinic acid, malonic acid, dimer acid, citraconic acid, etc. or their derivatves. The above polyesters may be modified by using, as the third component, various fatty acid such as caproic acid, capric acid, lauric acid, stearic acid, oleic acid, linoleic acid, linolenic acid, ricinoleic acid, etc., or their mono- or diglycerides, and the like.

(c) Those compounds which are prepared by esterifying a part of OH groups of a polymer of the alkyleneglycol monoester of polymerizable unsaturated carboxylic acid as defined in (a) with an unsaturated monocarboxylic acid such as acrylic acid, methacrylic acid, crotonic acid, etc., and if desired, further allowing the resultant compound to react with maleic acid, etc.

The high molecular compound containing OH groups and carboxylic groups all of which or a part of which are in the form of their quaternary ammonium salt or alkaline metal salt can be prepared by reacting the above mentioned compounds (a), (b) or (c) with ammonia, an organic tertiary amine or an alkaline metal compound. The organic tertiary amine includes trialkylamines (e.g. trimethylamine, triethylamine, tripropylamine, etc.), alkanolamines (e.g. dimethylethanolamine, diethylethanolamine, dibutylethanolamine, etc.), N-alkyl substituted cyclic amines (e.g. N-methyl morpholine, N-ethyl morpholine, N-propyl morpholine, N-methyl piperidine, N-ethyl piperidine, N,N'-dimethyl piperazine, N,N'-diethyl piperazine, N-methyl pyrrolidine, N-ethyl pyrrolidine, etc.), cyclic amines (e.g. pyridine, etc.), and the like. The alkaline metal compound includes sodium hydroxide, potassium hydroxide, sodium carbonate, potassium carbonate, sodium bicarbonate, potassium bicarbonate, etc. The amount of the amine or alkaline compound to be used is determined according to the desired content of the carboxylic quaternary ammonium or alkaline metal salt to be contained in the molecule. The reaction is conducted in the absence or presence of an inert solvent. The reaction temperature is generally around room temperature.

In the present method, the sum of the number of blocked NCO and free NCO groups per molecule of the partially blocked polyisocyanate to be used and the number of OH groups per molecule of the high molecular compound to be reacted with the partially blocked polyisocyanate should be at least 5. The upper limit of this sum is determined by the maximum number of the sum of free NCO groups and blocked NCO groups per molecule of the partially blocked polyisocyanate and by the maximum number of OH groups per molecule of the high molecular compound used in this method. In practice this, upper limit is (3+20=23) and preferably 15. For instance, when a diisocyanate having one blocked NCO group and one free NCO group is selected as the one starting material, a high molecular compound having at least 3, and, more practically, from 3 to 20 OH groups per molecule is used as the other starting compound, and when a triisocyanate having one blocked NCO group and two free NCO groups or having two blocked NCO groups and one free NCO group is selected as the one starting material, a high molecular compound having at least 2, and, more practically, from 2 to 20 OH groups per molecule is used as the other starting compound.

The ratio of the total number of OH groups of the high molecular compound to be used/the total number of free NCO groups of the partially block polyisocyanate to be used is more than 1 but less than 10, and, more desirably about 1.2 to about 3.0. Further, it is desirable to have a ratio of (the total OH groups of the high molecular compound to be used)/(the sum of the total free NCO groups and the total blocked NCO groups of the partially blocked polyisocyanate to be used) falling within the range of about 0.5 to about 4.0 and, more preferably about 1.0 to about 3.0.

In the present method, therefore, the kind of high molecular compound to be used and the kind of partially blocked polyisocyanate to be reacted therewith as well as the molar ratio between these two starting materials to be reacted with each other should be determined in accordance with the above standards.

The partially blocked polyisocyanate and the high molecular compound may be used singly or in a suitable combination. The reaction is conducted in an inert solvent at about 50 to about 160° C. As the inert solvent, there may be used those mentioned above in connection with the step of producing the partially blocked polyisocyanate. The use of the catalyst mentioned in the step of the production of the partially blocked polyisocyanate can accelerate the reaction.

By the present method, the blocked NCO groups themselves of the partially blocked polyisocyanate are not directly concerned in this reaction, while all free NCO groups of the partially blocked polyisocyanate react with the OH groups to form urethane linkages; but a certain number of OH groups remain as such in the resulting molecule without reacting with a free NCO group.

In this reaction, since OH groups are far more reactive to free NCO groups in comparison with the carboxylic group, the free NCO groups react exclusively with OH groups, and there is found substantially no reaction between free NCO groups and carboxylic groups.

Thus, the resulting compound contains blocked NCO groups, OH groups and carboxylic groups and/or carboxylic quaternary ammonium or alkali metal salt groups but contains substantially no free NCO groups. The number of blocked NCO groups contained in the whole resultant product is substantially the same as the total number of blocked NCO groups of the partially blocked polyisocyanate actually used as one of the starting materials.

The number of urethane linkages contained therein is substantially the same as the total number of the free NCO groups of the starting partially blocked polyisocyanate actually used, and the number of the OH groups contained therein is substantially the same as the number obtained by subtracting the total number of free NCO groups of the starting partially blocked polyisocyanate from the total number of the OH groups of the high molecular compound actually used as the other starting material. And, though the resultant product does not seem to consist of a single compound, the total number of blocked NCO groups and OH groups is in the average at least 3 per molecule.

In cases of using a high molecular compound containing OH groups and carboxyl groups, all of which or a part of which are in the form of their quaternary ammonium salt or alkali metal salt and a partially blocked di- or triisocyanate containing one free NCO group, including a partially blocked diisocyanate containing one free NCO group and one blocked NCO group and a partially blocked triisocyanate containing one free NCO group and two blocked NCO groups, the reaction of this method can be illustrated as follows:

(In the following, Z is a quaternary ammonium cation or alkali metal cation, $B_{NCO}$ is blocked NCO group, A is a radical derived by reducing all NCO groups from a di- or triisocyanate compound, M is a radical derived by reducing all carboxylic groups, its salt groups and all OH groups from a high molecular compound having a molecular weight of about 300 to about 30,000, and $m$, $n$, $p$ and $q$ are positive numbers).

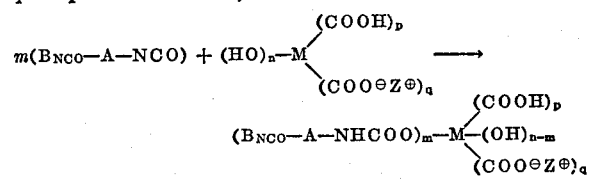

wherein $(2+n)$ is at least 5, more practically 5 to 22, more desirably 5 to 14 and $n/2m$ is more than about 0.5 but less than about 4.0, more preferably more than about 1.0 but less than about 3.0, and $(p+q)$ is such number that a compound of $(HO)_n—M—(COOH)_{p+q}$ has an acid value of about 30 to about 350, and $q/(p+q)\times 100$ is 100 to about 40.

(b)
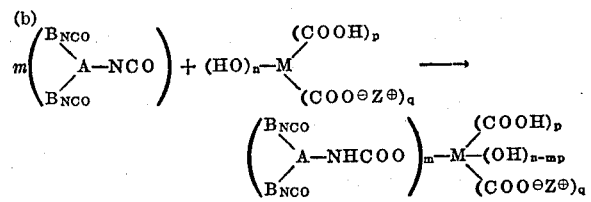

wherein $(3+n)$ is at least 5, more practically 5 to 23, more desirably 5 to 15 and $n/3m$ is more than about 0.5 but less than about 4.0, more preferably more than about 1.0 but less than about 3.0, and $p$ and $q$ have the same meaning as above.

For obtaining the above mentioned products, the aforementioned selection of the starting compounds as well as the afore-mentioned molar ratio between the two compounds to be used are essentially required. In other words, when the two starting compounds are selected according to the afore-mentioned standard for the selection and the thus selected compounds are allowed to react with each other in the above-mentioned molar ratio, the above-described products are necessarily given.

The product obtained by this method does not necessarily consist of a single component, but is accompanied with some by-produced components, and thus, the above formula represents an average product. However, the product consists chiefly of the compound mentioned before, and the by-produced components have substantially no affect on the properties of the final product.

When the high molecular compound containing no carboxyl quaternary ammonium or alkali metal salt group (i.e. in the above formulas, $q$ is 0) is used as the starting material, the resultant product is reacted with ammonia, the organic tertiary amine or alkaline compound as defined above, whereby all of or a part of (i.e. 40 to 100 mole percent, more desirably 60 to 90 mole percent) the free carboxyl groups are converted into their quaternary ammonium or alkaline metal salt. The amount of ammonia, the amine or alkaline compound to be used for this purpose varies with the desired content of the quaternary ammonium or alkaline metal salt of the final product. This reaction can be conducted by adding the amine or alkaline compound to the product of the preceding process. It is desirable to conduct this reaction in the presence of a water soluble solvent such as ethyl alcohol, propyl alcohol, butyl alcohol, diacetone alcohol, ethylene glycol monomethyl ether, ethylene glycol monoethyl ether, ethylene glycol monopropyl ether, ethylene glycol monobutyl ether, diethylene glycol monoethyl ether, etc. The reaction temperature is generally around room temperature.

This reaction may be illustrated as follows;

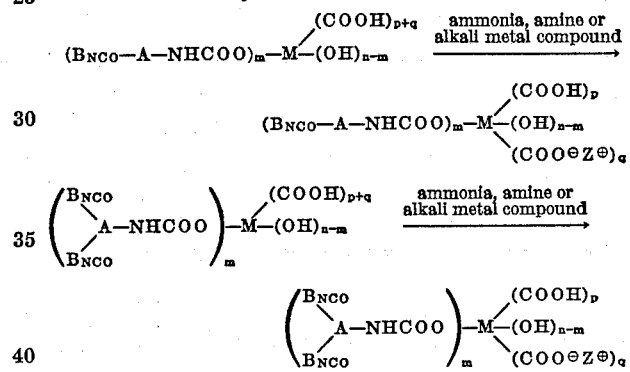

When heating the thus produced product, the blocked NCO group or groups are split to regenerate free NCO group or groups and the thus regenerated NCO group or groups react in turn with the OH groups, whereby a cross-linked resin is produced. The product obtained by this method is highly soluble or dispersible in water and therefore can be used as one-can type polyurethane coating agent as a solution of this compound in water. The content of the polyurethane compound in the solution is about 0.1 to about 80%, more practically 1 to 70%. Into the solution may be incorporated pigments, catalysts, fillers, leveling agents, stabilizers, antioxidants, etc.

The solution is applied on a substrate and heated at about 100 to about 250° C. to give a cured coating film.

The polyurethane compound of this method can be used as a coating agent for top-coat or under-coat of various substrates, such as automobiles, buildings, furniture, electric goods, etc., and further can be used as an adhesive agent, a finishing agent for fibrous materials, etc.

In the following examples, "part" is "weight part" unless otherwise stated, and the relation between "part by weight" and "part by volume" is the same as that between "gram" and "milliliter."

Preparation of partially blocked isocyanates (1) To 348 parts of tolylene diisocyanate (2,4-isomer/2,6-isomer=80/20 by weight) is slowly added 76 parts of ethylene glycol mono methyl ether at 60° C. Unreacted tolylene diisocyanate contained in the resultant is removed by extraction with hexane-benzene (1:1 by weight) and the residue is dissolved in ethyl acetate to make a 75% solution. Thus obtained solution contains substantially an adduct of 1 mole part of tolylene diisocyanate and 1 mole part of ethylene glycol monomethyl ether and contains no tolylene diisocyanate nor di-adduct of tolylene diisocyanate. (The product is abbreviated as "partially blocked isocyanate I".)

(2) To 336 parts of hexamethylene diisocyanate are added slowly 150 parts of p-tert-butylphenol and 0.15 part of tetra-n-butyl-1,3-diacetoxydistannoxane at 180° C. The resultant is treated after a similar manner to (1) to give 75% ethyl acetate solution containing an adduct of 1 mole part of hexamethylene diisocyanate and 1 mole part of p-tert-butylphenol. (The product is abbreviated as "partially blocked isocyanate II".)

(3) To 376 parts of ω,ω'-diisocyanate dimethyl benzene is slowly added 87 parts of methylethyl ketoxime at 60° C. The resultant is treated after a similar manner to (1) to give 75% ethyl acetate solution containing an adduct of 1 mole part of ω,ω'-diisocyanate dimethyl benzene and 1 mole part of methylethyl ketoxime. (The product is abbreviated as "partially blocked isocyanate III".)

(4) To 524 parts of 4,4'-dicyclohexylmethane diisocyanate is slowly added 102 parts of cyclohexanonoxime at 70° C., followed by keeping standing at the same temperature for 1 hour. The resultant is treated after a similar manner to (1) to give 75% ethyl acetate solution containing an adduct of 1 mole part of 4,4'-dicyclohexyl methane diisocyanate and 1 mole part of cyclohexanonoxime. (The product is abbreviated as "partially blocked isocyanate IV".)

(5) To 776 parts of ω,ω'-diisocyanate dimethyl cyclohexane is added slowly 87 parts of methylethyl ketoxime at 60° C. The resultant is subjected to extraction with n-hexane to remove unreacted diisocyanate, and then the resulting residue is made to a 75% ethyl acetate solution. (The product is abbreviated as "partially blocked isocyanate V".)

EXAMPLE 1

A mixture of 28 parts of styrene, 47 parts of butyl acrylate, 15 parts of acrylic acid, 40 parts of β-hydroxyethyl methacrylate, 70 parts of ethyl acetate and 1.5 parts of benzoyl peroxide is stirred at 80° C. for about 3 hours, and the resultant is further mixed with 1 part of benzoyl peroxide, followed by stirring at 95° C. for 3 hours. This procedure gives a polymer having molecular weight of 5200, acid value of 61.4 and hydroxyl number of 87.7.

To the polymer is added 60 parts of the partially blocked isocyanate I and the mixture is heated at 80° C. until no free NCO group is detected. Ethyl acetate contained in the resultant is replaced by ethylene glycol monoethyl ether to make a 60% solution.

To 100 parts of thus obtained solution are added 0.5 part of tetra-n-butyl-1,3-diacetoxydistannoxane, 8 parts of triethylamine and 20 parts of water, followed by stirring to adjust the pH value to 8.0.

The product obtained above has an average molecular weight of 6980 and corresponds to the average structural formula described in the specification

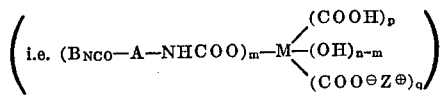

wherein p is 0, q is 8.8, n is 12.5 and m is 7.1.

Water is added to the above composition until the solid content is 10% and a steel panel is immersed as an anode in the aqueous solution. Electro deposit coating is conducted at a D-C voltage of 150 v. for 2 minutes, followed by baking at 180° C. for 30 minutes. The characteristics of the resulting film are shown in Table 1.

EXAMPLE 2

A reaction vessel is charged with 85 parts of linseed oil and 15 parts of maleic anhydride, and the mixture is heated at 220° C. for 5 hours. The temperature is lowered to 130° C. and 20 parts of trimethylol propane is added. The whole mixture is heated at 130° C. for 1.5 hours, whereby a high molecular compound having an average molecular weight of 3,500, an acid value of about 75 and a hydroxyl number of 55 is obtained. Then, the temperature is lowered to 80° C. and with the addition of 30 parts of the aforedescribed partially blocked isocyanate II and 0.05 part of tetra-n-butyl-1,3-diacetoxy distannoxane, the reaction is further allowed to continue at 80° C. until no more free isocyanate is detected. After the reaction is completed, the ethyl acetate solvent is replaced with ethylene glycol monoethyl ether to obtain a 60% resin solution. To 100 parts of this resin solution are added 7 parts of triethanolamine, 20 parts of water and 0.3 part of tetra-n-butyl-1,3-diacetoxy distannoxane. The product obtained above has an average molecular weight of 4200 and corresponds to the average structural formula described in the specification

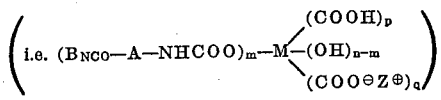

wherein p is 1.4, q is 3.3, n is 3.4 and m is 2.0. The above obtained composition is diluted with water to a solid content of 12%, and a steel panel is immersed as an anode in the resulting solution.

Electro deposit coating is conducted at a D-C voltage of 100 v. for 2 minutes, followed by baking at 160° C. for 30 minutes.

The characteristics of the resulting film are shown in Table 1.

EXAMPLE 3

Six-hundred parts of RF-100 (registered trade name of a copolymer of unsaturated alcohol-unsaturated carboxylic acid—the third component, manufactured and sold by Monsanto Chemical Co., U.S.A.) is reacted with 480 parts of linseed oil fatty acid at 220° C. for 7 hours, at the end of which time 90 parts of maleic anhydride is added. The reaction is further conducted at 230° C. for 3 hours to obtain a high molecular compound having an average molecular weight of 6,500 and an acid number of about 95.

The temperature is lowered to 80° C. and with the addition of 30 parts of the afore-described partially blocked isocyanate III and 0.05 part of tetra-n-butyl-1,3-diacetoxy distannoxane, the reaction is carried out at 80° C. until no more free isocyanate is detected. After the reaction is completed, the ethyl acetate in the resin is replaced with ethylene glycol monoethyl ether to obtain a resin solution having a solid content of 60%.

To 100 parts of the above resin solution, there are added 10.5 parts of triethanolamine, 0.5 part of tetra-n-butyl-1,3-diacetoxydistannoxane and 20 parts of water, and the solution is diluted with water to a solid content of about 10%. In this solution, a steel panel is immersed as an anode. Electro deposit coating is conducted at a D-C voltage of 100 v., followed by baking at 160° C. for 30 minutes. The characteristics of the resulting film are shown in Table 1.

CONTROL EXAMPLES 1 TO 6

To 8 parts of the polymer in the Examples 1 to 3, which is prior to the addition of the partially blocked isocyanate, is added 2 parts of water-soluble melamine resin (Cymel 301, registered trade name, American Cyanamid Co., U.S.A.) or water-soluble phenol-formaldehyde resin (Hitanol, registered trade name, Hitachi Kasei Kabushiki Kaisha, Japan) as a curing agent.

By using the mixture, the same electro deposit coating method as in examples is conducted. The characteristics of the resulting film are shown in Table 1.

TABLE 1

| Curing agent | | Film thickness (μ) | Corrosion resistance[1] | Acid resistance[2] | Alkaln resistance[3] | Film hardness[4] | Abrasion resistance[5] |
|---|---|---|---|---|---|---|---|
| Example 1 | | 25 | ±3 | Not affected | Not affected | 2H | 18 |
| Control Examples: | | | | | | | |
| 1 | Melamine resin | 24 | ±12 | Partly blistered | Softened film | F | 30 |
| 2 | Phenol-formaldehyde resin | 25 | ±10 | 50% blistered | Blistered all over | HB | 29 |
| Example 2 | | 24 | ±2 | Not affected | Not affected | H | 16 |
| Control Examples: | | | | | | | |
| 3 | Melamine resin | 24 | ±11 | Partly blistered | Partly blistered | F | 33 |
| 4 | Phenol-formaldehyde resin | 26 | ±5 | 50% blistered | Blistered all over | F | 31 |
| Example 3 | | 23 | ±4 | Not affected | Not affected | 2H | 17 |
| Control Examples: | | | | | | | |
| 5 | Melamine resin | 24 | ±12 | Partly blistered | Partly blistered | F | 33 |
| 6 | Phenol-formaldehyde resin | 26 | ±10 | 50% blistered | Blistered all over | F | 31 |

[1] After spraying a 5% aqueous solution of sodium chloride at 35°±1° C. over cross-cut portion of a film coated on the steel panel for 96 hours, the width of the film stripping off from the steel panel is measured (mm).
[2] 72 hours' immersion in 5% aqueous solution of $H_2SO_4$.
[3] 72 hours' immersion in 5% aqueous solution of NaOH.
[4] Pencil hardness (20° C.).
[5] Taber abrasion test, weight loss mg./100 cycles, 500 g. load.

EXAMPLE 4

The same acrylic resin as the one used in Example 1 is prepared, and 90 parts of the afore-described partially blocked isocyanate IV is added. The reaction is allowed to proceed at 80° to 85° C. until no more free isocyanate is detected. After the reaction is completed, the solvent in the resin solution is replaced with ethylene glycol monomethyl ether to obtain a 60% solution. To 100 parts of this resin solution, there is added 0.5 part of tetra-n-butyl-1,3-diacetoxy distannoxane, followed by the addition of 20 parts of water. With stirring, 7 parts of triethylamine is added to the mixture so as to bring it to pH 8.0. The product obtained above has an average molecular weight of 3600 and corresponds to the average structural formula described in the specification

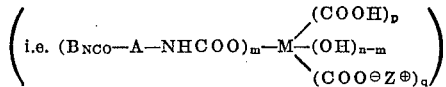

wherein $p$ is 2.4, $q$ is 3.8, $n$ is 5.7 and $m$ is 2.6.

In the same manner as Example 1, electro deposit coating is carried out, followed by baking at 150° C. for 30 minutes. The resulting film is considerably superior to the conventional films in gloss and weathering quality, not to speak of corrosion and abrasion resistance.

EXAMPLE 5

A reaction vessel is charged with 22 parts of styrene, 30 parts of butyl acrylate, 30 parts of maleic acid-propylene oxide adduct, 16 parts of acrylic acid, 100 parts of toluene and 1 part of azobisisobutyronitrile, and the mixture is heated at 80° C. with stirring for 3 hours, followed by heating at 95° C. for 2 hours. This procedure gives a polymer of an average molecular weight of 2840, hydroxyl number of 56.8 and acid value of 60.8.

To the polymer is added 34.9 parts of the above mentioned partially blocked isocyanate V and the mixture is heated at 80° C. until no more free isocyanate is detected. After the reaction is completed, the toluene solvent is replaced with ethylene glycol monoethyl ether to obtain 60% solution. To 100 parts of the solution are added 6.5 parts of triethylamine and 60 parts of water, followed by stirring.

The thus obtained product has an average molecular weight of 7800 and corresponds to the average structural formula described in the specification

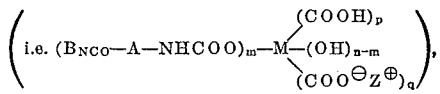

wherein $p$ is 0, $q$ is 8.8, $n$ is 12.5 and $m$ is 7.1.

The above obtained solution is diluted with water to give a solution of solid content of 25%. The solution is sprayed over an iron plate, followed by heating at 160° C. for 30 minutes.

The obtained film shows the following characteristics;

Sward Rocker hardness: 72
Pencil hardness: 3H
Bending test: 2 mm.
Scratch test: 20/20
Cross cut test: 100/100
Du Pont's impact test: ½″, 1 kg. 50 cm.
Resistance to boiling water: no appreciable change after 5 hours immersion

What we claim is:

1. A blocked isocyanate polymer substantially consisting of a compound of the general formula of

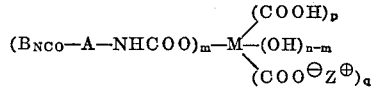

wherein $B_{NCO}$ is a blocked NCO group, A is a radical derived by removing all NCO groups from an organic diisocyanate, M is a radical derived by removing all OH groups and carboxyl and its salt groups from a high molecular compound having a molecular weight of about 350 to about 30,000 and an acid value of about 40 to about 150 and containing $n$ OH groups per molecule and carboxyl groups about 40 to 100 mole percent of which are in the form of a quaternary ammonium salt or alkali metal salt, $n$ and $m$ are positive numbers of not less than 1, $(2+n)$ is at least 5, and $n/2m$ is more than about 0.5 but less than about 4.0, Z is a quaternary ammonium cation or alkali metal cation, $(p+q)$ is such number that a compound of $(HO)_n$—M—$(COOH)_{p+q}$ has an acid value of about 30 to about 350, and $q/(p+q) \times 100$ is 100 to about 40.

2. A blocked isocyanate polymer substantially consisting of a compound of the general formula of

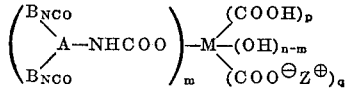

wherein $B_{NCO}$ is a blocked NCO group, A is a radical derived by removing all NCO groups from an organic triisocyanate, M is a radical derived by removing all OH groups and carboxyl and its salt groups from a high molecular compound having a molecular weight of about 350 to about 30,000 and an acid value of about 40 to about 150 and containing $n$ OH groups per molecule and carboxyl groups about 40 to 100 mole percent of which are in the form of a quaternary ammonium salt or alkali metal salt, $n$ and $m$ are positive numbers of not less than 1, $(3+n)$ is at least 5, and $n/3m$ is more than about 0.5 but less than about 4.0, Z is a quaternary ammonium cation or alkali metal cation, $(p+q)$ is such number that a compound of $(HO)_n-M-(COOH)_{p+q}$ has an acid value of about 30 to about 350, and $q/(p+q) \times 100$ is 100 to about 40.

References Cited

UNITED STATES PATENTS 3,491,050   1/1970   Keberle et al. _____ 260—29.2

FOREIGN PATENTS 1,076,688   7/1967   Great Britain ____ 260—77.5 Q
1,419,914   11/1965   France _____ 260—77.5 AB

OTHER REFERENCES

Application of Wakimoto, Kazama et al., Ser. No. 33,081, filed Apr. 29, 1970.

DONALD E. CZAJA, Primary Examiner

H. S. COCKERAM, Assistant Examiner

U.S. Cl. X.R.

204—181; 260—18 TN, 22 TN, 75 NK, 77.5 CR, 77.5 Q